United States Patent
Ding et al.

(10) Patent No.: US 6,625,527 B1
(45) Date of Patent: Sep. 23, 2003

(54) SENSOR SYSTEM WITH MONITORING DEVICE

(75) Inventors: Eve Limin Ding, Senftenberg (DE); Ralf Herbst, Nastätten (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/913,681

(22) PCT Filed: Jan. 25, 2000

(86) PCT No.: PCT/EP00/00539
§ 371 (c)(1),
(2), (4) Date: Dec. 11, 2001

(87) PCT Pub. No.: WO00/48883
PCT Pub. Date: Aug. 24, 2000

(30) Foreign Application Priority Data

Feb. 18, 1999 (DE) .......................... 199 06 799
Aug. 3, 1999 (DE) .......................... 199 36 439

(51) Int. Cl.⁷ .............................................. B60T 8/00
(52) U.S. Cl. ........................ 701/34; 701/29; 701/32; 701/33; 701/35; 701/70; 701/76; 180/197; 303/140; 303/146; 303/147
(58) Field of Search .............................. 701/29, 32, 33, 701/34, 35, 70, 76; 180/197; 303/140, 146, 147

(56) References Cited

U.S. PATENT DOCUMENTS

| | | | | |
|---|---|---|---|---|
| 4,646,227 A | * | 2/1987 | Corbin et al. .................. | 700/79 |
| 4,679,808 A | * | 7/1987 | Ito et al. ...................... | 180/408 |
| 4,916,612 A | * | 4/1990 | Chin et al. ...................... | 701/3 |
| 5,285,390 A | * | 2/1994 | Haseda et al. .................. | 701/41 |
| 5,471,388 A | * | 11/1995 | Zomotor et al. ............... | 701/36 |
| 5,602,732 A | * | 2/1997 | Nichols et al. ................ | 701/29 |
| 5,701,248 A | * | 12/1997 | Wanke .......................... | 701/70 |
| 5,707,117 A | * | 1/1998 | Hu et al. ................ | 303/122.08 |
| 5,732,377 A | * | 3/1998 | Eckert .......................... | 701/83 |
| 5,790,970 A | * | 8/1998 | Brachert et al. ............... | 701/70 |
| 6,122,568 A | * | 9/2000 | Madau et al. .................. | 701/1 |
| 6,122,577 A | * | 9/2000 | Mergenthaler et al. ....... | 701/34 |
| 6,175,790 B1 | * | 1/2001 | Lin et al. ...................... | 701/36 |
| 6,223,107 B1 | * | 4/2001 | Mergenthaler et al. ....... | 701/34 |
| 6,253,130 B1 | * | 6/2001 | Mergenthaler et al. ....... | 701/34 |

FOREIGN PATENT DOCUMENTS

| | | | |
|---|---|---|---|
| DE | 42 14 642 | 11/1993 | |
| DE | 42 19 457 | 12/1993 | |
| DE | 196 07 429 | 9/1997 | |
| DE | 196 36 443 | 3/1998 | |
| DE | 197 25 058 | 12/1998 | |
| EP | 762 363 | 9/1997 | |
| EP | 913 746 | 5/1999 | |
| WO | WO 9810297 A1 * | 3/1998 | .......... G01P/21/02 |
| WO | WO 9901718 A1 * | 1/1999 | .......... G01D/3/08 |

OTHER PUBLICATIONS

Dorr et al.: "Detection, Isolation, and Identification of Sensor Faults in Nuclear Power Plants", IEEE Transactions on Control Systems Technology, US, IEEE Inc., New York, vol. 5, No. 1, Jan. 1, 1997, p. 42–60.

* cited by examiner

*Primary Examiner*—William A. Cuchlinski, Jr.
*Assistant Examiner*—Eric M Gibson
(74) *Attorney, Agent, or Firm*—Rader, Fishman & Grauer PLLC

(57) ABSTRACT

A sensor system with monitoring device wherein the sensor system includes at least two redundant sensors for gathering a process reference variable or process measured variable of a process, and in that the monitoring device includes a first subtractor for producing a first difference between the sensor output signals, a first and a second differentiator for the time derivative of the sensor output signals, a second subtractor for producing a second difference between the differentiated sensor output signals, and a fault analysis device by which the first and the second difference is respectively compared with a predeterminable first or second threshold value, and a fault message is produced when at least one of the differences exceeds the threshold value concerned.

5 Claims, 2 Drawing Sheets

SENSOR SYSTEM WITH MONITORING DEVICE

TECHNICAL FIELD

The present invention relates to a sensor system with monitoring device and a method for operating such a system.

BACKGROUND OF THE INVENTION

Electronic stability programs of this type are systems for controlling the driving-dynamics of vehicles. These systems are primarily used to assist the driver in critical driving situations during braking, accelerating and steering, and to intervene where the driver himself/herself has no direct intervention possibility. The control system assists the driver when braking, especially on a roadway with a low or varying coefficient of friction, on which the vehicle might be no longer steerable due to locking wheels or might start to skid. It further assists in accelerating when there is a risk of spinning of the driven wheels. It can also be used to assist in steering during cornering, where the vehicle might oversteer or understeer. In total, not only the comfort but also the active safety will be improved considerably.

A control system of this type is based on a closed-loop control circuit which, during normal operation of the vehicle, takes over typical control tasks and is intended to stabilize the vehicle as quickly as possible in extreme driving situations. Sensors to sense the various driving-dynamics parameters are of special importance as generators of actual values. The precondition for a plausible control is that the sensors correctly represent the actual condition of the controlled system. This is particularly important in driving stability control operations in extreme driving situations, where a control deviation must be adjusted by the control already within a very short time. This is the reason why the ESP sensors (yaw rate sensor, transverse acceleration sensor, steering angle sensor) of an electronic stability program must be especially reliable and require constant monitoring in order to detect faults at an early point of time and rule out a faulty control which might cause a vehicle condition that is critical in terms of safety.

In view of the above, an object of the present invention is to provide a sensor system with a monitoring device and a method for operating a system of this type by which the reliability which is necessary for an electronic stability program (ESP) for vehicles can be achieved in a low-cost fashion.

This object is achieved by the present invention, wherein the sensor system includes at least two redundant sensors for sensing a process reference variable or process measured variable of a process, and the monitoring device includes a first subtractor for producing a first difference between the sensor output signals, a first and a second differentiator for the time derivative of the sensor output signals, a second subtractor for producing a second difference between the differentiated sensor output signals, and a fault analysis device by which the first and the second difference is respectively compared with a predeterminable first or second threshold value and a fault message is produced when at least one of the differences exceeds the threshold value concerned.

In a particularly favorable manner, the present invention can be combined with an ESP system for vehicles which is controlled by a microprocessor unit, and the sensor assembly is comprised of pairs of sensors in the form of respectively two redundant yaw rate sensors, two redundant transverse acceleration sensors, and/or two redundant steering angle sensors, and the monitoring device is implemented by a subprogram in the microprocessor unit.

The present invention is especially suited for the combination with a model-based monitoring of the sensors of an electronic stability program (ESP) for vehicles which is described in the parallel application (DE 199 29 155.1) and by reference herewith shall be made a part of the disclosure of this invention. In that system, respectively one of the sensors is monitored in that its output signal is compared with analytical reference values (redundancies) which are determined by means of a multi-process model from process reference variables or process measured variables that are not monitored currently. The accuracy of the calculated reference values depends, however, on the driving situation so that it cannot be excluded that specific faults will not be detected or will be detected too late in certain driving situations. The present invention offers a remedy for these cases.

A special advantage of the present invention involves that the monitoring time can be kept to be very short and the effort in time and structure can be minimized.

DETAILED DESCRIPTION OF THE PREFERRED EMBODIMENTS

The present invention is preferably used to monitor sensors which are employed in an electronic driving stability program (ESP) for vehicles. An ESP system of this type generally comprises a yaw rate sensor, a steering angle sensor, and a transverse acceleration sensor. In addition, the present invention is appropriate to monitor wheel rotational speed sensors for anti-lock and traction slip control systems and, in general, to monitor sensors which produce an output signal in dependence on a process measured variable or process reference variable to be ascertained. Monitoring can be effected cyclically at predetermined intervals and upon start of operation of the system.

Figure 1:
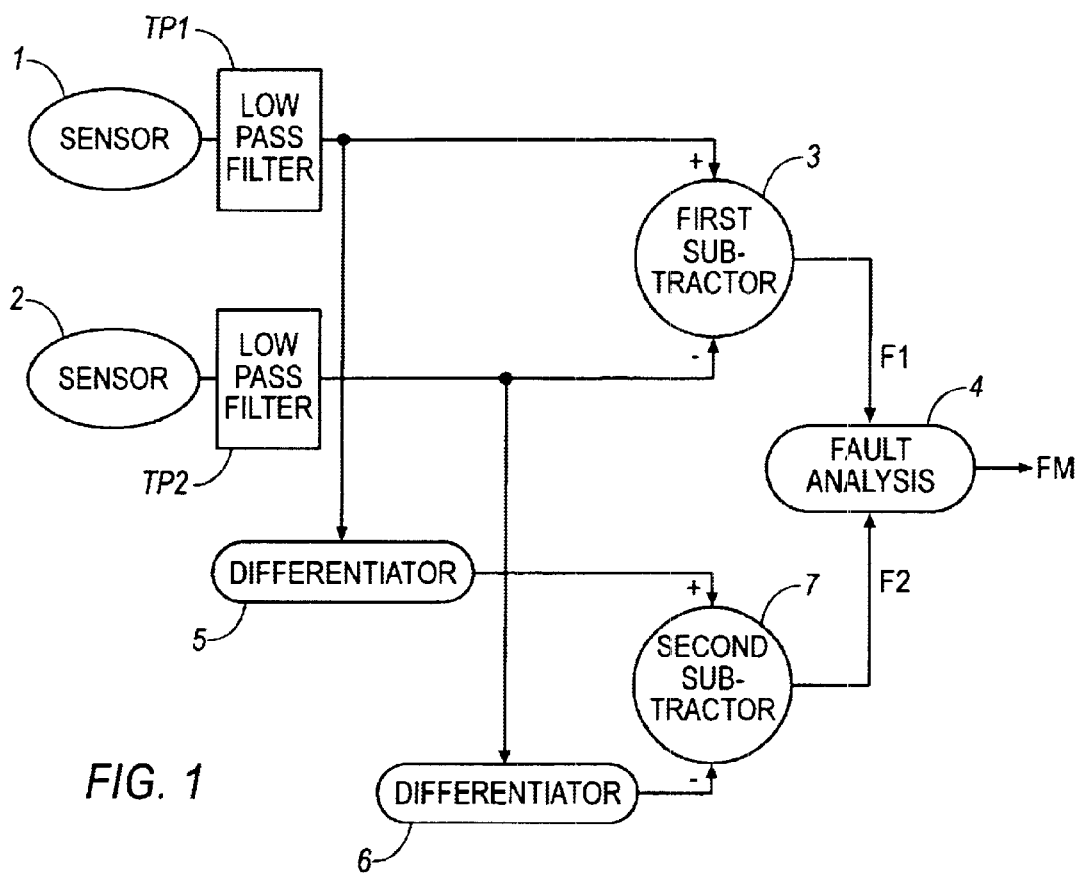
FIG. 1 is a block diagram of a sensor system according to the present invention.

FIG. 1 shows a block diagram of a sensor monitoring arrangement of the present invention. Monitoring of a yaw rate sensor is explained exemplarily herein. However, the principle is also applicable on other sensors in the same fashion.

According to FIG. 1, two identical sensors, i.e., a first and a second yaw rate sensor 1, 2, are provided, the output signals of which are passed through a first and/or a second PT1 low-pass filter TP1, TP2 and are then subtracted from one another by means of a first subtractor 3. The output signals of the yaw rate sensors 1, 2 which are filtered by way of the first and second low-pass filter TP1, TP2 are further conveyed via a first or second differentiator 5, 6 to produce a time derivative and, subsequently, are subtracted from one another by means of a second subtractor 7. The output signal of the first subtractor 3 (first difference F1) represents a yaw acceleration error signal, and the output signal of the second subtractor 7 (second difference F2) represents a yaw rate error signal. These two differences are applied to a device 4 for the fault analysis which produces a fault message FM under certain circumstances, after corresponding evaluation of the signals.

Figure 2:
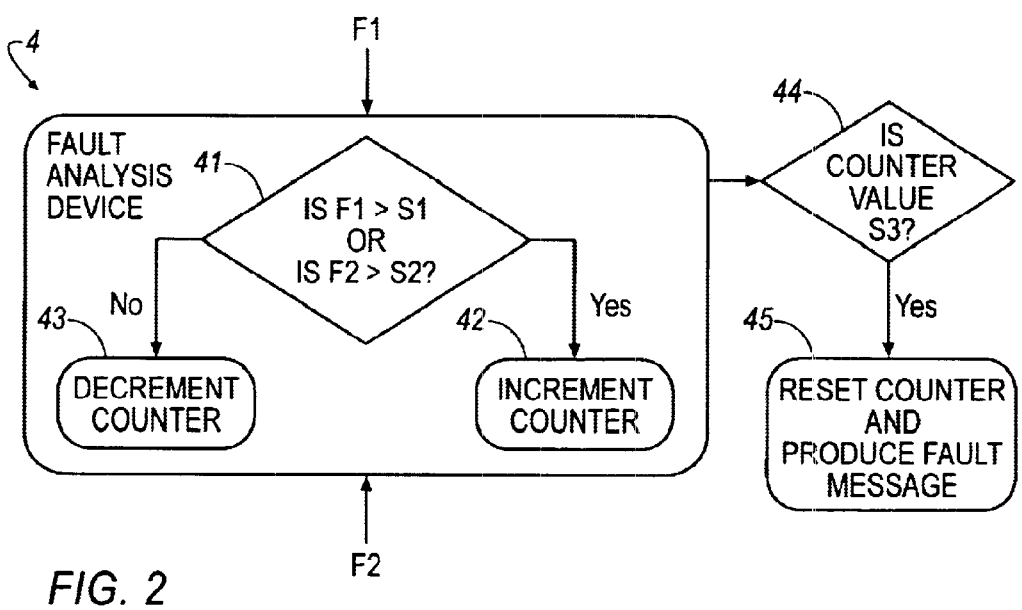
FIG. 2 is a detail view of FIG. 1.

The function of device 4 for fault analysis is illustrated as a flow chart in FIG. 2. In a first step 41, the two differences F1, F2 are respectively compared with a first or second threshold value S1, S2. When at least one of the differences exceeds the associated threshold value, the count of a counter is incremented by a defined value, preferably by value '1', in a second step 42. When the two differences F1, F2 are equal to, or lower than, the respective threshold value, and the count has a positive value, the count is decremented by the same value in a third step 43. The count is then compared with a third threshold value S3 in a fourth step 44. When the count exceeds this threshold value, the fault message FM is produced and the counter is reset to 0 in a fifth step 45.

Figure 3:
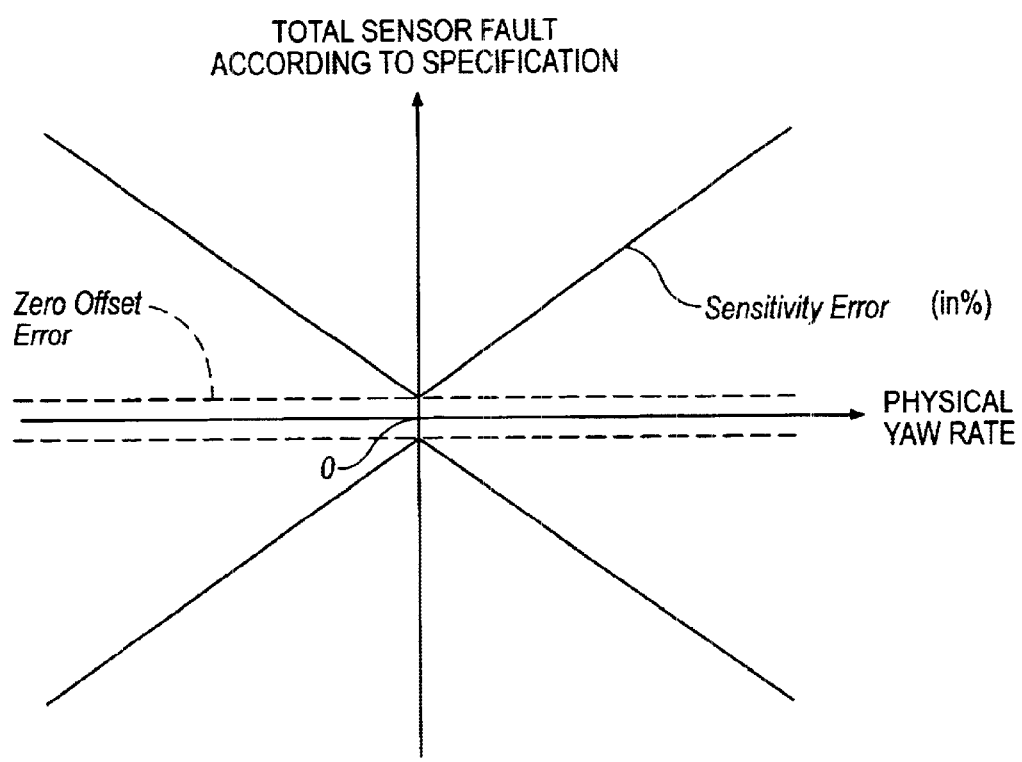
FIG. 3 is the typical course of a sensor fault corresponding to its specification.

The first and second threshold value S1, S2 is established in consideration of the fact that sensors can reach only a limited rate of accuracy, which is due to their type and manufacture. The sensor faults which are the result thereof according to their specification for a yaw rate sensor are illustrated in FIG. 3. The physical yaw rate is plotted on the horizontal axis, and the total sensor fault according to the specification is plotted on the vertical axis. The zero offset errors are plotted in broken lines in parallel to the horizontal axis, while the sensitivity errors in percent are illustrated in solid lines. To tolerate these sensor errors, the first threshold value S1 for the yaw rate is determined as follows:

$S1 = 2*(|\text{zero offset error}|+|\text{yaw rate maximum} * \text{sensitivity error}|)$ When the zero offset error shown in FIG. 3 and a sensitivity error of roughly 6% is assumed, and at a yaw rate maximum of 90° per second, there results the first threshold value S1 for the yaw rate at roughly 15°/sec.

The second threshold value S2 for the yaw acceleration is determined by driving tests and can preferably amount to 60°/sek2, for example.

The two threshold values S1, S2 are constant and independent of the driving situation in this first embodiment. Therefore, the threshold values must be chosen to be so high as to prevent wrong fault messages and deactivations of the ESP system due to the zero offset errors and the sensitivity errors in the total practical operating range. On the other hand, it may be possible that insignificant errors will not be detected for this reason, not even during straight travel.

Therefore, stationary driving behavior is defined as follows in a second embodiment of the present invention: When the difference between a first reference signal (Ref_steering angle) and a second reference signal (Ref_transverse acceleration) calculated from the transverse acceleration is smaller than, or equal to, 10°/sec, a vehicle reference speed is equal to, or higher than, 10.8 km/h, the transverse acceleration is equal to, or lower than 0.4 g, and the steering angle speed is equal to, or lower than, 100°/sec., the driving behavior is referred to as stationary. This condition can be sensed by the ESP sensors, by wheel rotational speed sensors, etc. When the vehicle is in such a stationary condition, the threshold values are adjusted as follows:

$S1 = 2*(|\text{zero offset error}|)+\text{max}(\text{reference signal error})+(\text{Ref\_steering angle}+\text{Ref\_transverse acceleration})/16$ $S2 = 40\%$ of the value of S2 in the first embodiment.

The first threshold value S1 for the yaw rate can minimally amount to roughly 7°/sec., the second threshold value S2 for the yaw acceleration can roughly amount to 25°/sec.

This means that in the stationary driving condition (substantially straight travel) the threshold values are minimal and, for example, during a stationary circular travel at least the first threshold value S1 for the yaw rate is increased corresponding to the yaw rate reference signals in order to tolerate the sensitivity errors of the sensor.

The first and second reference signal (Ref_steering angle, Ref_transverse acceleration) is calculated by forming a model for the yaw rate from the steering angle or the transverse acceleration, for example, according to the following models which are described in the above-mentioned parallel application:

$$\dot{\psi} = \frac{\delta_L}{i_L l} \frac{v_{ref}}{\left(1+\left(\frac{v_{ref}}{v_{ch}}\right)^2\right)} \text{ and } a_q = v_{ref}\dot{\psi}$$

The following designations imply:

| | |
|---|---|
| $v_{ref}$ | vehicle reference speed; |
| $\psi$ | yaw rate; |
| $a_q$ | transverse acceleration; |
| $\delta_L$ | steering wheel angle; |
| $i_L$ | steering ratio; |
| l | wheelbase; |
| $v_{ch}$ | characteristic driving speed. |

The practical realization is preferably achieved by means of the microprocessor system employed for the ESP control, and processing of the sensor signals is controlled by a corresponding (sub) program. Practical tests have shown that even insignificant sensor faults are detected during stable straight travel.

What is claimed is:

1. Sensor system comprising:

first and second redundant sensors for sensing a process reference variable or process measured variable of a process and generating first and second output signals, respectively, a monitoring device including a first subtractor for producing a first difference value between the first and second output signals, respectively, a first and a second differentiator for generating time derivative signals of the first and second output signals, respectively, a second subtractor for producing a second difference between the first and second time derivative signals a fault analysis device for comparing the first and the second difference with a respectively associated first and second threshold value, wherein at least one of said first or second threshold values is determined according to the following relation:

$S1 = 2 * (|\text{zero offset error}|+|\text{yaw rate maximum} * \text{sensitivity error}|);$ wherein a fault message is produced when at least one of the first or second differences exceeds the threshold value concerned.

2. Sensor system as claimed in claim 1, further including a counter which is incremented by a predeterminable value when at least one of the first and second differences exceeds the first or second threshold value, and which is decremented by a predeterminable value when neither the first nor the second differences exceed the predeterminable first or second value, and wherein the fault message is produced when the count exceeds a predeterminable third threshold value.

3. Sensor system as claimed in claim 1, wherein the process is an electronic driving stability program for vehicles, and the sensor system comprises two redundant yaw rate sensors, two redundant transverse acceleration sensors, or two redundant steering angle sensors.

4. Sensor system as claimed in claim 1, wherein the first and second sensor output signals are conveyed by a low-pass filter.

5. Sensor system comprising:
   first and second redundant sensors for sensing a process reference variable or process measured variable of a process and generating first and second output signals, respectively,
   a monitoring device including a first subtractor for producing a first difference value between the first and second output signals, respectively,
   a first and a second differentiator for generating time derivative signals of the first and second output signals, respectively,
   a second subtractor for producing a second difference between the first and second time derivative signals
   a fault analysis device for comparing the first and the second difference with a respectively associated first and second threshold value,
   wherein at least one of said first or second threshold values is determined according to the following relation:

$$S1=2*(|\text{zero offset error }|)+\text{maximum reference signal error})+(\text{reference steering angle}+\text{reference transverse acceleration})/16$$

wherein a fault message is produced when at least one of the first or second differences exceeds the threshold value concerned.

* * * * *